Aug. 6, 1968   J. C. McCRAE ETAL   3,396,032
COMPRESSIBLE INFUSION DEVICE
Filed Oct. 9, 1964
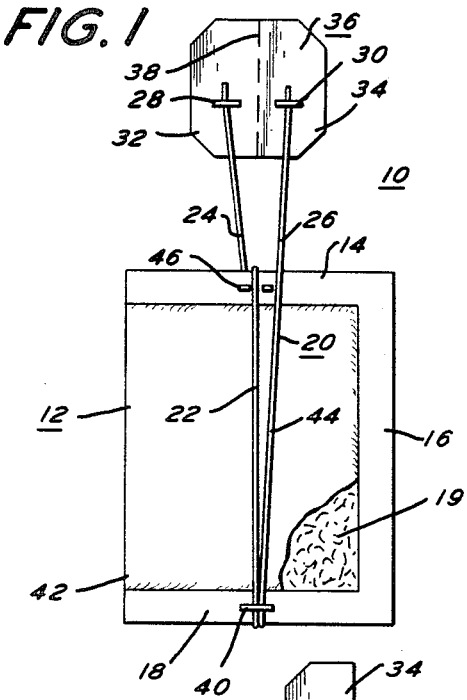
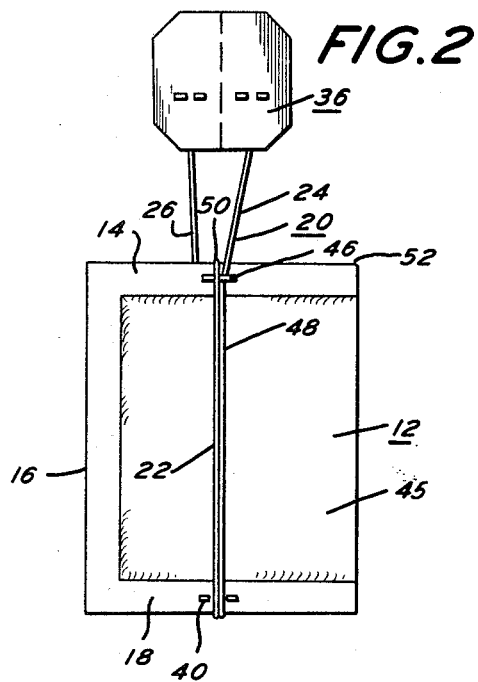
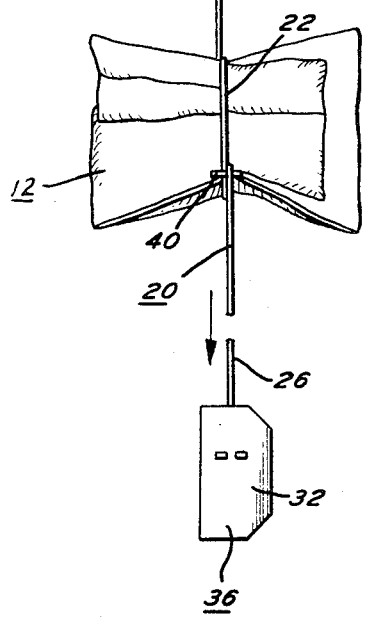
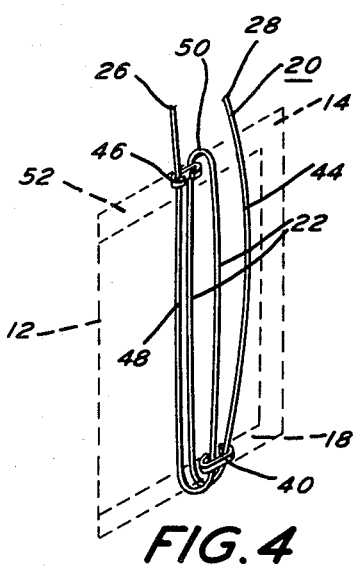
INVENTOR
JOHN C. McCRAE
HARRY A. DOOLEY
BY
Jacob Trachtman
ATTORNEY

United States Patent Office 3,396,032
Patented Aug. 6, 1968

3,396,032
COMPRESSIBLE INFUSION DEVICE
John C. McCrae, Chester, Pa. (100 Delaware Ave., Ridley Park, Pa. 19078), and Harry A. Dooley, 2952 Miller St., Philadelphia, Pa. 19134
Filed Oct. 9, 1964, Ser. No. 402,816
7 Claims. (Cl. 99—77.1)

ABSTRACT OF THE DISCLOSURE

An infusion bag enclosing a quantity of infusible material and having a draw cord positioned about and over the top and bottom portions of said bag to provide at least one and one-half turns about said bag with first and second positioning means at the top and bottom of said bag for maintaining said cord about said bag, whereby forces applied to opposite ends of said cord compresses said bag to express steeping liquid therefrom.

---

The invention relates to a tea bag device, and more particularly to a tea bag device which can be compressed for expelling liquid from the tea bag after it has been steeped in water.

Although tea bag devices have been provided which can be compressed for the stated purpose, it is an object of the invention to provide a new and improved tea bag which is easily operated, and is of highly simplified construction.

Another object of the invention is to provide a new and improved tea bag device which may easily and efficiently be operated to compress the tea bag and expel liquid therefrom.

Another object of the invention is to provide a new and improved tea bag device which is highly inexpensive to manufacture, and utilizes certain components of presently produced tea bag devices.

The foregoing and other objects of the invention are achieved by the tea bag device which is described below in connection with the accompanying drawing, in which:

FIGURE 1 is a front elevational view of the tea bag device embodying the invention, FIGURE 2 is a rear elevational view of the device shown in FIGURE 1, FIGURE 3 illustrates the tea bag device of FIGURE 1 in its compressed state, and FIGURE 4 is a perspective view of the device with the tea bag in dotted form for illustrating the arrangement of the cord about the tea bag.

Like reference numerals designate like parts throughout the several views.

Referring to the figures, the tea bag device 10 embodies the invention and includes the tea bag 12 made of water permeable material having top, side and bottom edge regions 14, 16 and 18 providing a cavity 19 enclosing tea leaves or other materials which is provided for steeping in water to make tea or other such beverage.

A cord 20 has a loop 22 positioned about the bag 12 with ends 24, 26, each secured by a metal staple or other suitable means 28, 30 to a respective section 32, 34 of a tab element 36. The tab element 36 is provided with a perforation 38 for allowing its sections 32, 34 to be readily detached from each other. As seen most clearly in FIGURE 1, the loop 22 is maintained in position at the bottom edge region 18 by a metal staple 40 on the front side 42 of the tea bag 12. The portion 44 of the cord 20, which extends to the end 26, also passes under and is maintained in position at the bottom 18 of the tea bag 12 by the staple 40. The metal staple 40 allows the cord of the loop 22 and the portion 44 passing thereunder to move freely therethrough. The metal staple 40, as seen from FIGURE 2, does not secure the loop 22 or cord 20 on the rear side 45 of the tea bag 12.

As also seen in FIGURE 2, a metal staple 46 is provided at the top edge region 14 of the tea bag 12 for positioning at the top edge region 14 the portion 48 of the cord 20 which passes along the back surface 45 of the tea bag 12. The staple 46 similarly allows free movement therethrough of the cord 48 which extends to the end 24 of the cord 20 secured with the tab element 36. It is also noted that the top 50 of the loop 22 also freely passes over the top edge 52 of the bag 12 and is not received under the staple 46. This is clearly evident from FIGURE 1 which illustrates the staple means 46 as it appears on the front surface 42 of the bag 12 so that it does not secure the cord on either side of the bag 12. The staple element 46 serves to position the tab element 36 proximate the top edge 52 of the tea bag 12, as illustrated in FIGURES 1 and 2. FIGURE 4 also serves to clearly illustrate the arrangement of the cord 20 about the tea bag 12 (shown in dashed lines) by the staples 40, 46.

When the tea bag device 10 is to be utilized for preparing a beverage, such as tea and the like, the bag 12 is immersed in a fluid by grasping the tab element 36 and allowing the bag 12 to depend thereunder for steeping in hot liquid.

Upon removal of the bag from the liquid, the tab element 36 has its sections 32, 34 detached along the perforations 38 and the tea bag 12 is compressed for expelling liquid therefrom by drawing the sections 32, 34 of the tab element 36 in opposite directions, as indicated in FIGURE 3 by the arrows. The loop 22 is contracted with the movement of the cord through the metal staples 40, 46 as the ends 24, 26 move in the direction shown by the arrows in FIGURE 3. The tea bag device 10 can now be disposed of after being used to provide the beverage by the infusion process and after having the liquid taken up by the bag 12 dispelled by the tension applied in opposite directions to the tab section 32, 34, thereby compressing the loop 22 of the cord 20.

The tea bag device 10 provides advantages in simplicity of construction and operation, resulting in a device which can be produced at low cost. The tab element provides means for immersing the tea bag similar to the conventional mode of producing tea beverages, while providing detachable tab sections and a looped cord slidably positioned about the tea bag by staples for effectively allowing the compression of the tea bag and the expulsion of fluid therefrom to complete the tea producing operation.

While this invention has been described and illustrated with reference to a specific embodiment, it is to be understood that the invention is capable of various modifications and applications, not departing essentially from the spirit thereof, which will become apparent to those skilled in the art.

What is claimed is:

1. An infusion bag enclosing a quantity of tea or like material, said bag being constructed of permeable material and having top and bottom portions, a draw cord for compressing said bag having first and second ends and a loop positioned about and over the top and bottom portions of said bag to provide at least one and one-half turns about said bag, and first and second positioning means respectively at the top and bottom of said bag for maintaining the loop of said cord about and outside of said bag, for at least said one and one-half turns of said loop, said first and second ends being extendable in opposite directions for compressing said loop and the bag therewithin, said first and second ends of said cord passing through and extending respectively from said first and second positioning means at the top and bottom of said bag when said ends of said cord are extended in said opposite directions, whereby when forces in opposite directions are applied respectively to the first and second ends of said cord said opposite forces are transmitted through said respective first and second positioning means to said loop which is looped about said bag for at least one and one-half turns, said forces being mainly applied to said loop while such forces which are applied by said cord to said positioning means are respectively distributed between said first and second positioning means.

2. The device of claim 1 including a tab element and attaching means securing the first and second ends of said cord with said element.

3. The device of claim 2 in which said positioning means comprises clip means at the top and bottom portions of said bag for slidably receiving said cord therethrough for allowing compression of said loop and bag therewithin.

4. The device of claim 3 in which said clip means comprises a metal staple at the top portion of said bag receiving said cord at the first end of its loop thereunder without receiving its loop thereunder and a metal staple at the bottom portion of said bag receiving said cord at the second end of its loop and its loop in side by side position thereunder.

5. The device of claim 4 in which said tab element has first and second sections detachably secured together, said first and second sections being respectively attached with said first and second ends of said cord and being detachable for extension in opposite directions for compressing said loop and bag therewithin.

6. The device of claim 5 in which said clip means maintains said cord about said bag with said tab positioned proximate the top of said bag.

7. The device of claim 6 in which said attaching means comprises metal staples securing the ends of said cord respectively with the first and second sections of said tab element.

References Cited

UNITED STATES PATENTS

| | | | |
|---|---|---|---|
| 2,406,137 | 8/1946 | Eaton | 99—77.1 |
| 2,791,505 | 5/1957 | Barnett | 99—77.1 |
| 2,878,927 | 3/1959 | Haley | 99—77.1 X |
| 2,881,910 | 4/1959 | Murphy | 99—77.1 X |
| 3,237,550 | 3/1966 | Christopher | 99—287 |

RAYMOND N. JONES, *Primary Examiner.*